April 11, 1939.   J. MARCHBANK   2,153,635

DEVICE FOR SECURING GLASS PANES IN WINDOW FRAMES

Filed Nov. 16, 1937

Inventor
John Marchbank
By Pennie Davis Marvin & Edmonds
Attorneys

Patented Apr. 11, 1939

2,153,635

UNITED STATES PATENT OFFICE 2,153,635

DEVICE FOR SECURING GLASS PANES IN WINDOW FRAMES

John Marchbank, Glasgow, Scotland, assignor to Frederick Braby & Company Limited, Glasgow, Scotland, a corporation of Great Britain Application November 16, 1937, Serial No. 174,782
In Great Britain November 17, 1936

3 Claims. (Cl. 20—56)

This invention relates to improvements in devices for securing glass panes in window frames and the like, particularly devices of the type including a bead frame secured to the window frame around the marginal surface of the pane.

Devices for use in securing glass panes in window frames, according to the invention, comprises corner pieces each of which presents a horizontal limb and a vertical limb, said limbs being of open channel shape in cross section having side flanges and the said side flanges of the horizontal limbs being integral continuations of the corresponding side flanges of the vertical limbs.

Desirably one side flange of the corner piece presents a rounded corner and is of less depth than the other side flange so as to accommodate a flange presented by a clip adapted to be attached to the window frame whereby the said corner piece, bead frame and glass pane are held in position within the window frame.

Fig. 1 of the accompanying drawing is a fragmentary perspective view illustrating the bead frame and pane of glass secured by devices according to the invention.

Figure 1:
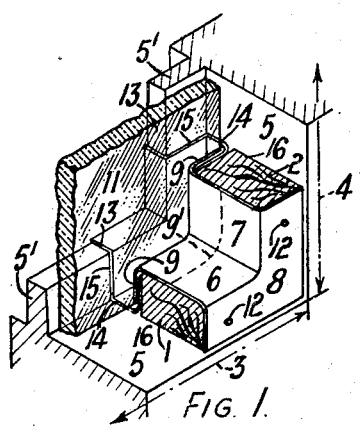

As illustrated by Fig. 1 the bead frame which is constituted by horizontal and vertical beads or bars 1, 2 respectively is connected by corner pieces. The ends of the beads or bars 1, 2, need not be angled or mitred and the bead bars are shorter than the horizontal and vertical dimensions 3, 4 respectively of the window frame 5 so that, when assembled, gaps are presented at the corners of the frame. The corner pieces, which cover the said gaps, are formed of channel-shaped sheet metal and present horizontal and vertical limbs 6 and 7 respectively. The outer and inner side walls 8, 9 respectively, of the channel-shaped corner pieces may be right angled so as to fit into the corners of the window frame 5. The ends of the horizontal beads 1 are inserted into the channel-shaped horizontal limbs 6 of the corner pieces and the ends of the vertical beads 2 are inserted into the channel-shaped vertical limbs 7 of the corner pieces, the beads being secured, it may be by nails or the like, to the window frame.

The bead frame may be made of wood, metal, fibre or other suitable material.

If desired, and in order that the window may present rounded corners, the base wall 10 (Fig. 2) of the channel-shaped corner pieces may be curved.

The corner pieces may be held in position by having their inner side walls 9 interposed between the extremities of the beads and the marginal surfaces of the pane 11 at the corners thereof.

If desired, the corner pieces may be secured to the beads by sprigs 12 or the like.

Instead of securing the beads to the window frame 5 by nails or the like the beads may be secured by clips of double U-shape, that is, a clip composed of sheet metal bent to present a U-shaped channel 13 then reverted to present a contiguous oppositely directed U-shaped channel 14. The channel 13 is fitted over the inwardly directed flange 5' of the window frame 5. The marginal surface of the pane 11 and the adjacent or inner wall 9 of the corner piece are inserted into the channel 14, the connecting wall 15 of the channels 13, 14, which is common to both channels, being interposed between the pane 11 and the flange 5' and the outer wall 16 of the channel 14 being interposed between the inner wall 9 and the bead.

A clip such as described is associated with the limb 6 of the corner piece and a similar clip is associated with the limb 7 of the same corner piece.

Desirably these two clips are integral, the connecting wall 15 between the channels 13, 14 being continuous and the outer walls being cut to permit bending against the pane 11 and flanges 5' of the window frame 5 at the corners thereof, the corner pieces being held in position by the clips.

To accommodate the clip 13, 14, 15 and to permit the right angled corner of the outer wall 8 of the corner piece to fit snugly into the corner of the window frame 5 the inner wall 9 of the corner piece may be rounded at the corner as shown at 9' (Fig. 1) and may be of less depth than the outer wall 8 of the corner piece.

Figure 3:
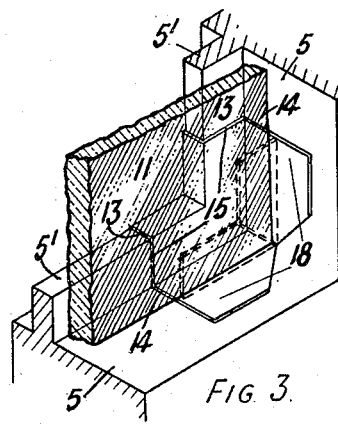
Fig. 3 is a perspective view showing the operation of assembling the pane and a clip hereinafter described.

The operation of assembling the clips and corner pieces is illustrated by Fig. 3.

A sheet metal blank, bent to present the channels 13, is placed over the horizontal and vertical flanges 5' of the frame 5 at the corner thereof so that the flat portions 18 of the blank lie against the horizontal and vertical surfaces respectively of the frame 5. The marginal surface of the pane 11 is placed against the wall 15 of the channel 13 and then the portions 18 are bent against the pane, as shown by dotted lines, to present the channel 14. The bead frame and the corner pieces are then placed in position and secured.

Figure 2:
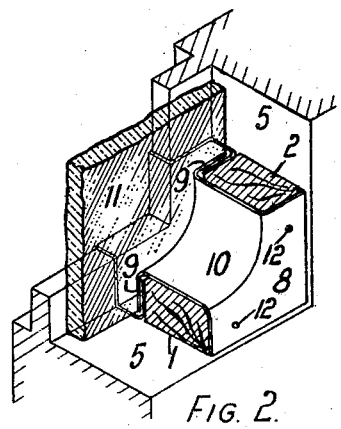
Fig. 2 is a similar view illustrating a modified form of corner piece.
Figure 4:
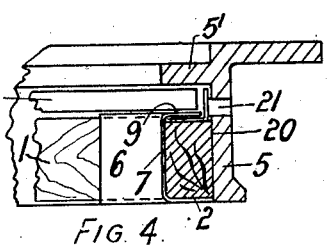
Fig. 4 is a section illustrating a modified form of clip and corner piece.

A modified form of clip, illustrated by Fig. 4, may be substituted for the clips shown by Figs. 1-3.

The clip, Fig. 4, comprises a sheet metal strip 20 provided with a pin 21 which penetrates the frame 5. After the pane 11 has been placed in position the strip 20 is bent to lie against the marginal surface thereof. The bead is placed against the clip 20 and the marginal surface of the pane and then the corner pieces are placed in position and secured, the wall 9 of the corner piece being interposed between the clip 20 and the marginal surface of the pane.

In order that the window may be weatherproof the pane 11 may be embedded in putty or the like.

I claim:

1. For use with a window in which the pane is secured in position by a bead frame secured round the marginal edge of the pane, a corner piece which is of channel shape in cross section and presents a horizontal limb and a vertical limb shaped to receive respectively the adjacent end portions of a pair of horizontal and vertical components of the bead frame and having side flanges, the side flanges of the horizontal limb being undivided continuations of the side flanges of the vertical limb on the same side of the corner piece and a clip having a flange interposed between a side flange of the corner piece and the bead frame.

2. For use with a window in which the pane is secured in position by a bead frame secured round the marginal edge of the pane, a corner piece which is of channel shape in cross section and presents a horizontal limb and a vertical limb shaped to receive respectively the adjacent end portions of a pair of horizontal and vertical components of the bead frame and having side flanges, the side flanges of the horizontal limb being undivided continuations of the side flanges of the vertical limb on the same side of the corner piece, one undivided side flange of the corner piece having a rounded corner and being of less depth than the other undivided side flange of the corner piece, and a clip which presents a channel adapted to engage a flange of a window frame and a channel adapted to engage a window pane and a side flange of the corner piece.

3. For use with a window in which the pane is secured in position by a bead frame secured round the marginal edge of the pane, a corner piece which is of channel shape in cross section and presents a horizontal limb and a vertical limb shaped to receive respectively the adjacent end portions of a pair of horizontal and vertical components of the bead frame and having side flanges, the side flanges of the horizontal limb being undivided continuations of the side flanges of the vertical limb on the same side of the corner piece and a clip of right angle formation having a flange adapted to be interposed between a side flange of the corner piece and the bead frame and a flange adapted to be secured to the window frame.

JOHN MARCHBANK.